US011984066B2

(12) United States Patent
Bao

(10) Patent No.: US 11,984,066 B2
(45) Date of Patent: May 14, 2024

(54) PROCESSING METHOD AND PROCESSING DEVICE FOR PIXEL DATA, DISPLAY DEVICE, DISPLAY METHOD, AND COMPUTER READABLE STORAGE MEDIUM

(71) Applicants: Hefei Xinsheng Optoelectronics Technology Co., Ltd., Anhui (CN); BOE Technology Group Co., Ltd., Beijing (CN)

(72) Inventor: Wenchao Bao, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 608 days.

(21) Appl. No.: 16/490,395

(22) PCT Filed: Feb. 15, 2019

(86) PCT No.: PCT/CN2019/075241
§ 371 (c)(1),
(2) Date: Aug. 30, 2019

(87) PCT Pub. No.: WO2019/227971
PCT Pub. Date: Dec. 5, 2019

(65) Prior Publication Data

US 2021/0335224 A1 Oct. 28, 2021

(30) Foreign Application Priority Data

May 30, 2018 (CN) ........................ 201810545728.0

(51) Int. Cl.
*G09G 3/3208* (2016.01)

(52) U.S. Cl.
CPC ... *G09G 3/3208* (2013.01); *G09G 2320/0242* (2013.01); *G09G 2320/048* (2013.01);
(Continued)

(58) Field of Classification Search
None
See application file for complete search history.

(56) References Cited

U.S. PATENT DOCUMENTS

| | | | |
|---|---|---|---|
| 7,277,075 | B1 | 10/2007 | Hirano et al. |
| 2006/0033752 | A1 | 2/2006 | Gering et al. |

(Continued)

FOREIGN PATENT DOCUMENTS

| | | | |
|---|---|---|---|
| CN | 104247409 | A | 12/2014 |
| CN | 104795052 | A | 7/2015 |

(Continued)

OTHER PUBLICATIONS

Sep. 3, 2019—(CN) First Office Action Appn 201810545728.0 with English Translation.

*Primary Examiner* — Benjamin C Lee
*Assistant Examiner* — Emily J Frank
(74) *Attorney, Agent, or Firm* — Banner & Witcoff, Ltd.

(57) ABSTRACT

A processing method and a processing device for pixel data, a display device, a display method, and a storage medium are provided. The processing method includes: determining a target pixel point in pixel points of a display frame image to be revised, a pixel data of each pixel point including S initial pixel data of different primary colors and a white initial pixel data; converting a white initial pixel data in a pixel data of the target pixel point into S equivalent pixel data of the different primary colors; obtaining S target pixel data of the different primary colors and a white target pixel data of the target pixel point according to the S equivalent pixel data and according to S initial pixel data of the
(Continued)

different primary colors in the pixel data of the target pixel point, the white target pixel data corresponding to a 0 gray scale.

19 Claims, 9 Drawing Sheets

(52) U.S. Cl.
CPC ............... *G09G 2320/0626* (2013.01); *G09G 2360/147* (2013.01)

(56) References Cited

U.S. PATENT DOCUMENTS

| | | | | |
|---|---|---|---|---|
| 2010/0277400 | A1* | 11/2010 | Jeong | G09G 3/3275 345/76 |
| 2013/0201224 | A1* | 8/2013 | Kang | H04N 9/73 345/690 |
| 2014/0071189 | A1* | 3/2014 | Park | G09G 5/02 345/694 |
| 2014/0118411 | A1* | 5/2014 | Jang | G09G 3/3208 345/690 |
| 2015/0364081 | A1* | 12/2015 | Tseng | G09G 3/3413 345/694 |
| 2016/0005381 | A1* | 1/2016 | Yata | G09G 3/2074 345/82 |
| 2016/0267828 | A1* | 9/2016 | Zhang | H04N 9/646 |
| 2017/0124943 | A1* | 5/2017 | Peana | G09G 3/3225 |
| 2017/0270843 | A1* | 9/2017 | Lee | G09G 3/3291 |
| 2018/0240415 | A1* | 8/2018 | Chen | H04N 5/202 |
| 2019/0259325 | A1* | 8/2019 | Chaji | G06T 7/90 |
| 2021/0150964 | A1* | 5/2021 | Li | G09G 3/3258 |

FOREIGN PATENT DOCUMENTS

| | | | |
|---|---|---|---|
| CN | 105721843 | A | 6/2016 |
| CN | 106713696 | A | 5/2017 |
| CN | 107680544 | A | 2/2018 |
| CN | 107863081 | A | 3/2018 |
| CN | 108711396 | A | 10/2018 |
| KR | 20150075605 | A | 7/2015 |

* cited by examiner

PROCESSING METHOD AND PROCESSING DEVICE FOR PIXEL DATA, DISPLAY DEVICE, DISPLAY METHOD, AND COMPUTER READABLE STORAGE MEDIUM

The application is a U.S. National Phase Entry of International Application No. PCT/CN2019/075241 filed on Feb. 15, 2019, designating the United States of America and claiming priority to Chinese Patent Application No. 201810545728.0 filed on May 30, 2018. The present application claims priority to and the benefit of the above-identified applications and the above-identified applications are incorporated by reference herein in their entirety.

TECHNICAL FIELD

Embodiments of the present disclosure relate to a processing method and a processing device for pixel data, a display device, a display method, and a computer readable storage medium.

BACKGROUND

Organic light emitting diode (short for OLED) display devices are widely used in various electronic devices including electronic products such as computers and mobile phones due to their advantages of self-illumination, light weight, low power consumption, high contrast, high color gamut, and be capable of achieving flexible display.

RGBW (red, green, blue, white) four-color technology can increase light transmittance and brightness of the OLED display devices, and give users a feeling of more sparking and crystal-clear on the screen. Therefore, the RGBW four-color technology is widely used in the OLED display devices. In the OLED display devices, lighting time of a white sub-pixel W is much longer than lighting time of a red sub-pixel R, lighting time of a green sub-pixel G, and lighting time of a blue sub-pixel B, respectively, which leads to an aging speed of the white sub-pixel W to be accelerated, and further the life of the display device being shortened.

SUMMARY

Some embodiments of the present disclosure provide a processing method for pixel data, and the processing method comprises: determining a target pixel point in pixel points of a display frame image to be revised, in which a pixel data of each of the pixel points comprises S initial pixel data of different primary colors and a white initial pixel data, and S is a positive integer; converting a white initial pixel data in the pixel data of the target pixel point into S equivalent pixel data of the different primary colors; and obtaining S target pixel data of the different primary colors and a white target pixel data of the target pixel point according to the S equivalent pixel data of the different primary colors in the pixel data of the target pixel point and according to S initial pixel data of the different primary colors in the pixel data of the target pixel point, in which the white target pixel data corresponds to a 0 gray scale.

For example, in the processing method provided by some embodiments of the present disclosure, the determining the target pixel point in pixel points of the display frame image to be revised comprises: obtaining S initial pixel data of the different primary colors and white initial pixel data of all pixel points in any one display frame image; in a case where a ratio of a sum of brightness corresponding to the white initial pixel data of the all pixel points in the one display frame image to a sum of brightness corresponding to the S initial pixel data of the different primary colors and the white initial pixel data of the all pixel points in the one display frame image is greater than or equal to a first threshold value, determining that the one display frame image is the display frame image to be revised, and then determining the target pixel point in the pixel points of the display frame image to be revised.

For example, in the processing method provided by some embodiments of the present disclosure, the first threshold value is greater than or equal to 70%.

For example, in the processing method provided by some embodiments of the present disclosure, the display frame image to be revised comprises a plurality of target pixel points, the determining the target pixel point in pixel points of the display frame image to be revised comprises: determining portion pixel points of the pixel points in the display frame image to be revised as the plurality of target pixel points.

For example, in the processing method provided by some embodiments of the present disclosure, n continuous display frame images to be revised constitute a display frame group to be revised, and n is a positive integer; in the display frame group to be revised, positions of target pixel points of different display frame images to be revised are different from each other.

For example, in the processing method provided by some embodiments of the present disclosure, positions of all target pixel points in the n continuous display frame images to be revised are in one-to-one correspondence to positions of all pixel points of a display frame image.

For example, in the processing method provided by some embodiments of the present disclosure, the determining the portion pixel points of the pixel points in the display frame image to be revised as the plurality of target pixel points comprises: determining all pixel points located in a (i+n*k)-th pixel point column of an i-th display frame image to be revised in the display frame group to be revised as a plurality of target pixel points corresponding to the i-th display frame image to be revised, in which $$k=\left\{0,1,2\ \ldots\left\lceil\frac{N-n}{n}\right\rceil\right\},$$

$1\le i+n*k\le N$, $1\le i\le n$, N is a total number of pixel point columns in the i-th display frame image to be revised.

For example, in the processing method provided by some embodiments of the present disclosure, the determining the portion pixel points of the pixel points in the display frame image to be revised as the plurality of target pixel points comprises: determining all pixel points located in a (j+n*k)-th pixel point row of a j-th display frame image to be revised in the display frame group to be revised as a plurality of target pixel points corresponding to the j-th display frame image to be revised, in which $$k=\left\{0,1,2\ \ldots\left\lceil\frac{M-n}{n}\right\rceil\right\},$$

$1\le j+n*k\le M$, $1\le j\le n$, M is a total number of pixel point rows in the j-th display frame image to be revised.

For example, in the processing method provided by some embodiments of the present disclosure, the obtaining the S target pixel data of the different primary colors and the white target pixel data of the target pixel point according to the S equivalent pixel data of the different primary colors in the pixel data of the target pixel point and according to the S initial pixel data of the different primary colors in the pixel data of the target pixel point comprises: superimposing the S equivalent pixel data of the different primary colors and the S initial pixel data of the different primary colors respectively to obtain the S target pixel data of the different primary colors and the white target pixel data.

Some embodiments of the present disclosure further provide a display method of a display device, the display device comprises a plurality of pixel units, and the display method comprises: obtaining S target pixel data of the different primary colors and a white target pixel data corresponding to a target pixel point in a display frame image to be revised, in which the S target pixel data of the different primary colors and the white target pixel data are obtained by the processing method for pixel data of any one of the above embodiments; controlling a pixel unit, which corresponds to the target pixel point, of the plurality of pixel units to display according to the S target pixel data of the different primary colors and the white target pixel data.

Some embodiments of the present disclosure further provide a display method of a display device, the display device comprises a plurality of pixel units, and the display method comprises: obtaining a plurality of target pixel data groups corresponding to a plurality of target pixel points respectively, in which each target pixel data group in the plurality of target pixel data groups comprises S target pixel data of different primary colors and a white target pixel data, the S target pixel data of the different primary colors and the white target pixel data in each target pixel data group are obtained by any one of the processing methods for pixel data mentioned above; in a case where all pixel points in the display frame image to be revised are the plurality of target pixel points, controlling each pixel unit of the plurality of pixel units to display according to S target pixel data of the different primary colors and a white target pixel data in a target pixel point corresponding to each pixel unit, or, in a case where portion pixel points of the pixel points in the display frame image to be revised are the plurality of target pixel points, controlling each pixel unit of the plurality of pixel units corresponding to the plurality of target pixel points to display according to corresponding S target pixel data of the different primary colors and a corresponding white target pixel data, obtaining a plurality of initial pixel data groups corresponding to pixel points other than the plurality of target pixel points, in which each of the initial pixel data groups comprises S initial pixel data of the different primary colors and a white initial pixel data, controlling each pixel unit of a plurality of pixel units, which correspond to pixel points, other than the plurality of target pixel points, in the pixel points in the display frame image to be revised, to display according to corresponding S initial pixel data of the different primary colors and a corresponding white initial pixel data.

For example, in the display method provided by some embodiments of the present disclosure, each pixel unit of the plurality of pixel units comprises S primary color sub-pixels and a white sub-pixel, the S primary color sub-pixels are in one-to-one correspondence with the S target pixel data of the different primary colors, and the white sub-pixel corresponds to the white initial pixel data.

Some embodiments of the present disclosure further provide a processing device for pixel data, and the processing device comprises a memory and a processor; a computer program is stored in the memory, and the processor is configured to execute the computer program to achieve any one of the processing methods mentioned above.

Some embodiments of the present disclosure further provide a computer readable storage medium, which stores a computer program, and in a case where the computer program is executed by a computer, any one of the processing methods mentioned above is achieved.

Some embodiments of the present disclosure further provide a processing device for pixel data, and the processing device comprises: a target pixel determination module, configured to determine a target pixel point in pixel points of a display frame image to be revised, in which a pixel data of each of the pixel points comprises S initial pixel data of different primary colors and a white initial pixel data, and S is a positive integer; a conversion module, configured to convert a white initial pixel data in a pixel data of the target pixel point into S equivalent pixel data of the different primary colors; a target pixel data acquisition module, configured to obtain S target pixel data of the different primary colors and a white target pixel data of the target pixel point according to the S equivalent pixel data of the different primary colors in the pixel data of the target pixel point and according to S initial pixel data of the different primary colors in the pixel data of the target pixel point, in which the white target pixel data corresponds to a 0 gray scale.

Some embodiments of the present disclosure further provide a display device, and the display device comprises a plurality of pixel units and any one of the processing devices for pixel data mentioned above.

Embodiments of the present disclosure provide a processing method for pixel data and a processing device for pixel data, a display device, a display method, and a computer readable storage medium. The processing method for pixel data comprises: determining a target pixel point in pixel points of a display frame image to be revised, in which a pixel data of each of the pixel points comprises S initial pixel data of different primary colors and a white initial pixel data, and S is a positive integer; converting a white initial pixel data in a pixel data of the target pixel point into S equivalent pixel data of the different primary colors; obtaining S target pixel data of the different primary colors and a white target pixel data of the target pixel point according to the S equivalent pixel data of the different primary colors in the pixel data of the target pixel point and according to S initial pixel data of the different primary colors in the pixel data of the target pixel point, in which the white target pixel data corresponds to a 0 gray scale.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure, and those skilled in the art can obtain other drawing(s) according to these drawings, without any inventive work.

DETAILED DESCRIPTION

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but to distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may include an electrical connection which is direct or indirect. The terms "on," "under," "right," "left" and the like are only used to indicate relative position relationship, and when the position of an object is described as being changed, the relative position relationship may be changed accordingly.

Figure 1:
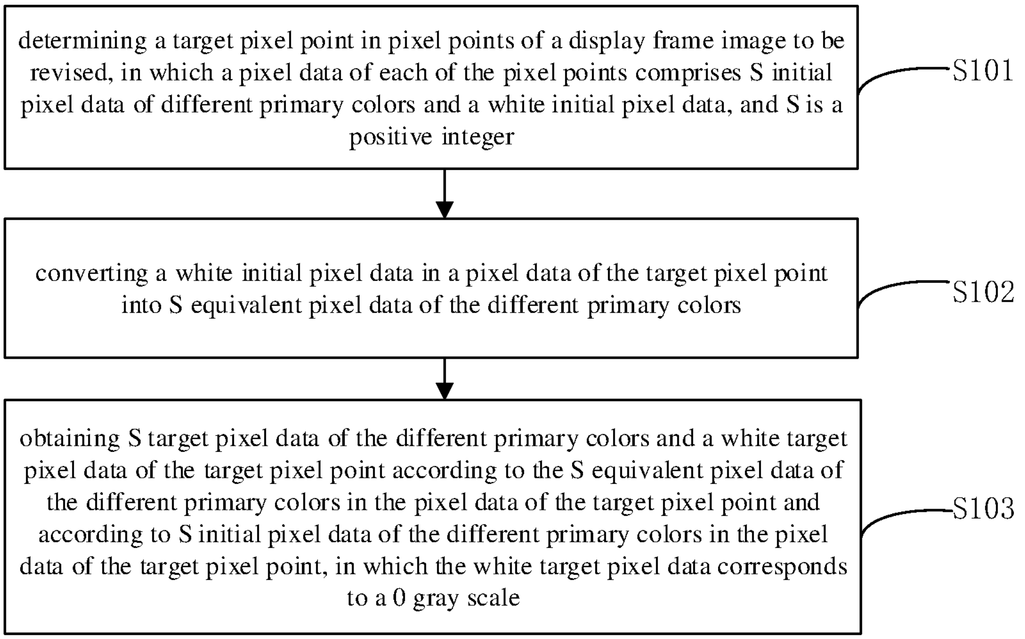
FIG. 1 is a flowchart of a processing method for pixel data provided by some embodiments of the present disclosure.

At least one embodiment of the present disclosure provides a processing method for pixel data, as illustrated in FIG. 1, the processing method comprises:

Step S101, determining a target pixel point in pixel points of a display frame image to be revised, in which a pixel data of each of the pixel points comprises S initial pixel data of different primary colors and a white initial pixel data, and S is a positive integer;

For example, in step S101, the target pixel point can be determined according to a preset rule, for example, the preset rule may be that a pixel point on a fixed position in the display frame image to be revised is selected as the target pixel point, or the preset rule may also be that a pixel point for displaying white in the display frame image to be revised is selected as the target pixel point. The preset rule may be determined according to actual requirements, which are not limited by the embodiments of the present disclosure.

For example, the S initial pixel data of the different primary colors correspond to S different primary colors.

Herein, it should be noted that, the specific colors of the above S different primary colors are not limited in the present disclosure, the S different primary colors may be three primary colors of red, green, and blue, respectively, the S different primary colors can also be complementary colors of the three primary colors of red, green and blue, and the complementary colors are cyan, magenta, and yellow, of course, the S different primary colors can also be other colors for display, the present disclose does not limit the S different primary colors, as long as the S different primary colors can achieve to display a picture of different colors. In the following embodiments, the present disclosure is further described by taking a case that the S different primary colors are the three primary colors of red, green and blue respectively as an example. That is, in the present disclosure, the S initial pixel data of the different primary colors comprises a red initial pixel data R1, a green initial pixel data G1, and a blue initial pixel data B1, the red initial pixel data R1 corresponds to red, the green initial pixel data G1 corresponds to green, and the blue initial pixel data B1 corresponds to blue. The pixel data of each of the pixel points includes the red initial pixel data R1, the green initial pixel data G1, the blue initial pixel data B1, and a white initial pixel data W1, and the white initial pixel data W1 corresponds to white.

Step S102, converting a white initial pixel data in a pixel data of the target pixel point into S equivalent pixel data of the different primary colors.

For example, the S equivalent pixel data of the different primary colors comprises a red equivalent pixel data R2, a green equivalent pixel data G2, and a blue equivalent pixel data B2.

For example, in step 102, the white initial pixel data W1 can be converted into the red equivalent pixel data R2, the green equivalent pixel data G2, and the blue equivalent pixel data B2.

Specifically, it should be understood that, white with a specific brightness can be equivalent to a specific proportion of red, blue, and green, that is, by converting the white initial pixel data W1 in the target pixel point into the red equivalent pixel data R2, the green equivalent pixel data G2, and the blue equivalent pixel data B2, and therefore, in a case where the display is performed according to the red equivalent pixel data R2, the green equivalent pixel data G2, and the blue equivalent pixel data B2, a white effect, which has the same brightness as the brightness when the white initial pixel data W1 is displayed, can be achieved (that is, $L_{W1}=L_{R2}+L_{G2}+L_{B2}$, in which, $L_{W1}$ represents the brightness of a sub-pixel in a case where the sub-pixel displays according to the white initial pixel data W1, $L_{R2}$ represents the brightness of a sub-pixel in a case where the sub-pixel displays according to the red equivalent pixel data R2, $L_{G2}$ represents the brightness of a sub-pixel in a case where the sub-pixel displays according to the green equivalent pixel data G2, $L_{B2}$ represents the brightness of a sub-pixel in a case where the sub-pixel displays according to the blue equivalent pixel data B2).

Step S103, obtaining S target pixel data of the different primary colors and a white target pixel data of the target pixel point according to the S equivalent pixel data of the different primary colors in the pixel data of the target pixel point and according to S initial pixel data of the different primary colors in the pixel data of the target pixel point, in which the white target pixel data corresponds to a 0 gray scale.

For example, the S target pixel data of the different primary colors comprise a red target pixel data, a green target pixel data, and a blue target pixel data.

For example, in some examples, step S103 may comprise: superimposing the S equivalent pixel data of the different primary colors and the S initial pixel data of the different primary colors respectively to obtain the S target pixel data of the different primary colors and the white target pixel data.

Herein, it needs to be noted that, the superimposing the S equivalent pixel data of the different primary colors and the S initial pixel data of the different primary colors respectively means that the equivalent pixel data and the initial pixel data, which corresponds to the same color, are superimposed separately. For example, the red equivalent pixel data and the red initial pixel data are superimposed to obtain the red target pixel data, the green equivalent pixel data and the green initial pixel data are superimposed to obtain the green target pixel data, and the blue equivalent pixel data and the blue initial pixel data are superimposed to obtain the blue target pixel data; of course, the "superimposing" or "superimposed" herein can be a direct addition or a weighted addition, and so on, which are not limited in the embodiment of present disclosure, in practice, the corresponding superposition method can be selected according to requirements.

For example, the red initial pixel data R1 and the red equivalent pixel data R2 are superimposed to obtain the red target pixel data R', that is, $R'=R1+R2$ or $R'=\alpha 1*R1+\alpha 2*R2$, in which, $\alpha 1$ is a weighting coefficient of the red initial pixel data R1, and $\alpha 2$ is a weighting coefficient of the red equivalent pixel data R2; the green initial pixel data G1 and the green equivalent pixel data G2 are superimposed to obtain the green target pixel data G', that is, $G'=G1+G2$ or $G'=\beta 1*G1+\beta 2*G2$, in which, $\beta 1$ is a weighting coefficient of the green initial pixel data G1 and $\beta 2$ is a weighting coefficient of the green equivalent pixel data G2; the blue initial pixel data B1 and the blue equivalent pixel data B2 are superimposed to obtain the blue target pixel data B', that is, $B'=B1+B2$ or $B'=\gamma 1*B1+\gamma 2*B2$, in which, $\gamma 1$ is a weighting coefficient of the blue initial pixel data B1 and $\gamma 2$ is a weighting coefficient of the blue equivalent pixel data B2; because the white initial pixel data W1 is equivalently replaced by the red equivalent pixel data R2, the green equivalent pixel data G2, and the blue equivalent pixel data B2, in this case, the white target pixel data corresponds to the 0 gray scale, that is, in a case of displaying, the sub-pixel corresponding to the white target pixel data in the target pixel point is in a dark state (that is to say, the sub-pixel is not lit up).

In summary, in the present disclosure, the white initial pixel data corresponding to the target pixel point is converted into S equivalent pixel data of the different primary colors, the S equivalent pixel data of the different primary colors and the S initial pixel data of the different primary colors corresponding to the target pixel point are respectively superimposed to obtain the S target pixel data of the different primary colors and the white target pixel data of the target pixel point, in which the white target pixel data corresponds to the 0 gray scale. That is, in a case where the target pixel point displays, the sub-pixel corresponding to the white target pixel data is in a dark state (not lit up), and the S sub-pixels respectively corresponding to the S target pixel data of the different primary colors display the initial brightness corresponding to the S initial pixel data of the different primary colors, and simultaneously display the brightness corresponding to the white initial pixel data equivalently by a synergistic effect, in this way, in a case where the white target pixel data corresponds to the 0 gray scale (that is, the sub-pixel corresponding to the white target pixel data is not lit up), the display effect of the target pixel point can be achieved only by the S sub-pixels in the target pixel point displaying according to the S target pixel data of the different primary colors respectively, the display effect is the same as a display effect of the S sub-pixels in the target pixel point respectively displaying according to the corresponding S initial pixel data of the different primary colors and the white sub-pixel in the target pixel point displaying according to the corresponding white initial pixel data, and thus, the lighting time of the white sub-pixel corresponding to the white target pixel data is reduced, and the problem that the lifetime of the display device is lowered due to the excessive lighting time of the white sub-pixel is solved.

On this basis, the determining a target pixel point in pixel points of a display frame image to be revised in step S101 is further explained in the following.

Figure 2:
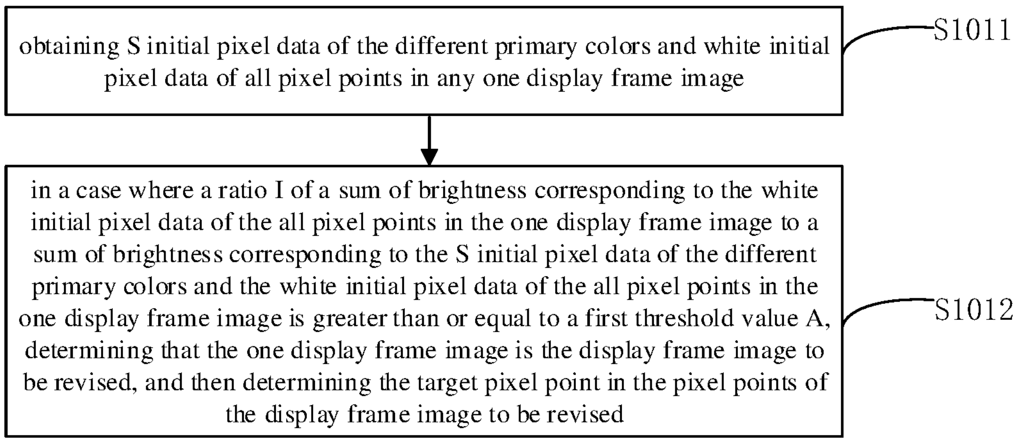
FIG. 2 is a flowchart of step S101 in the processing method for pixel data shown in FIG. 1.
Figure 3A:
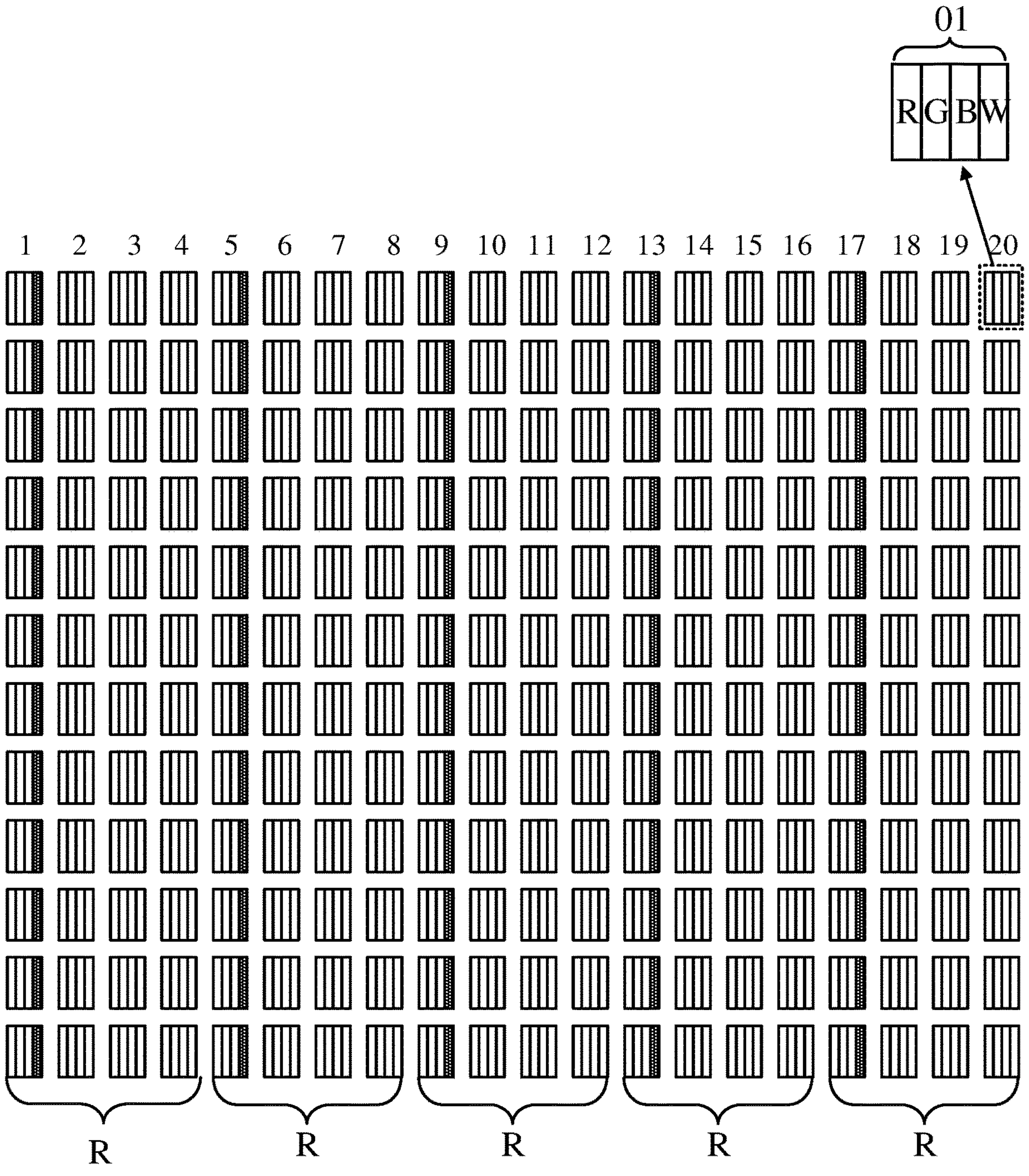
FIG. 3*a* is a schematic diagram of lighting sub-pixels corresponding to a display frame image to be revised provided by some embodiments of the present disclosure.
Figure 3B:
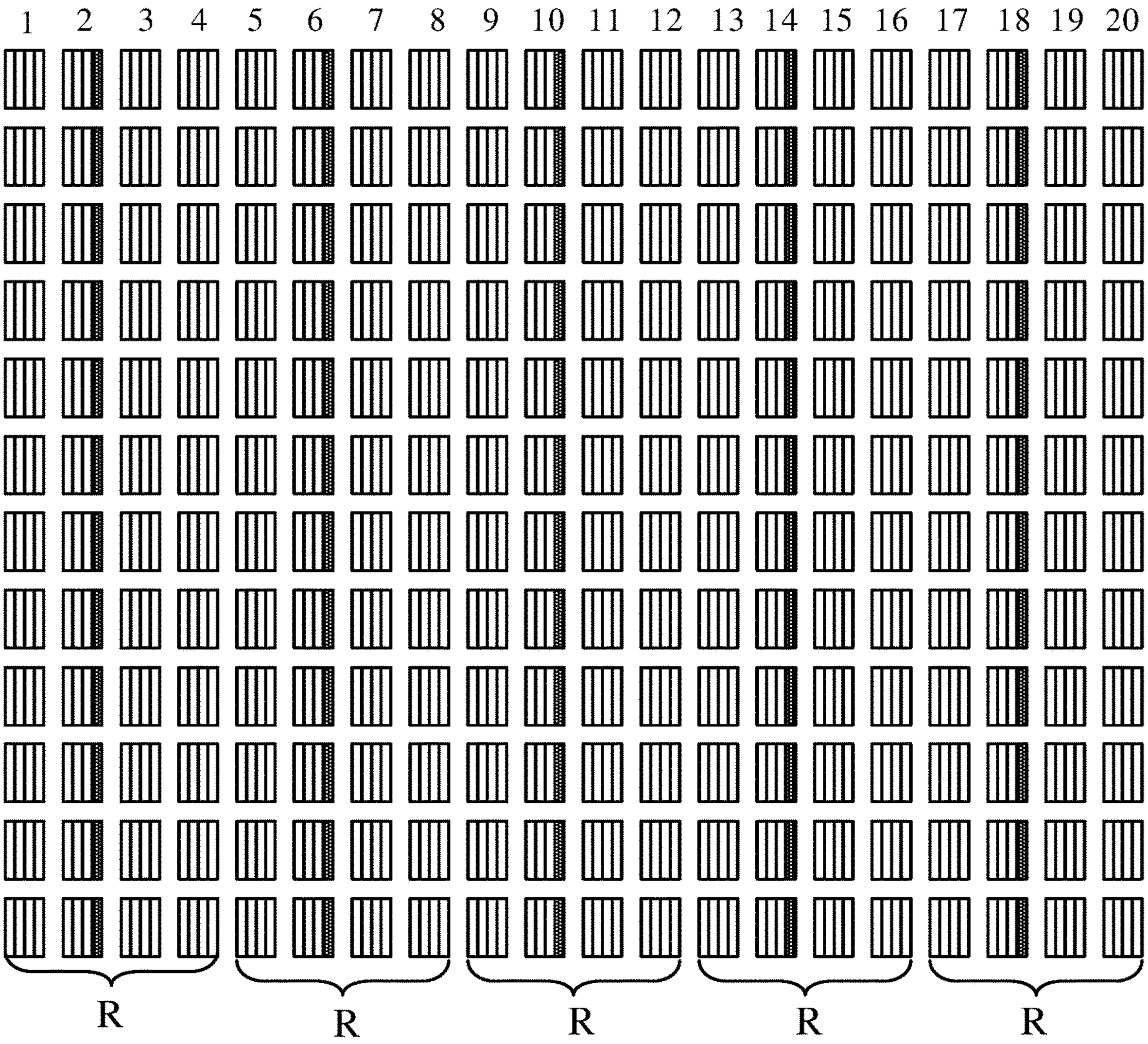
FIG. 3*b* is a schematic diagram of lighting sub-pixels corresponding to another display frame image to be revised provided by some embodiments of the present disclosure.
Figure 3C:
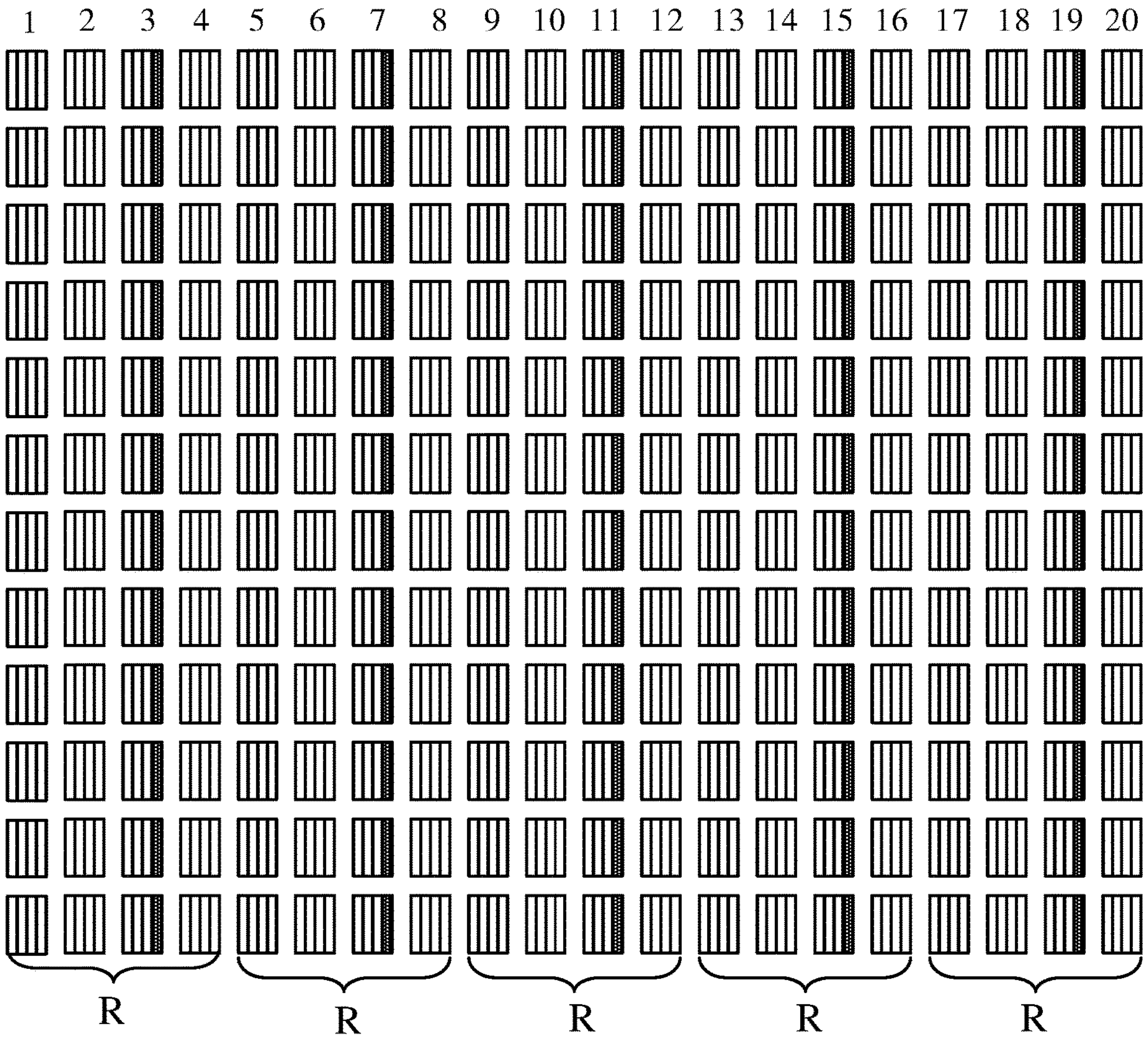
FIG. 3*c* is a schematic diagram of lighting sub-pixels corresponding to still another display frame image to be revised provided by some embodiments of the present disclosure.
Figure 3D:
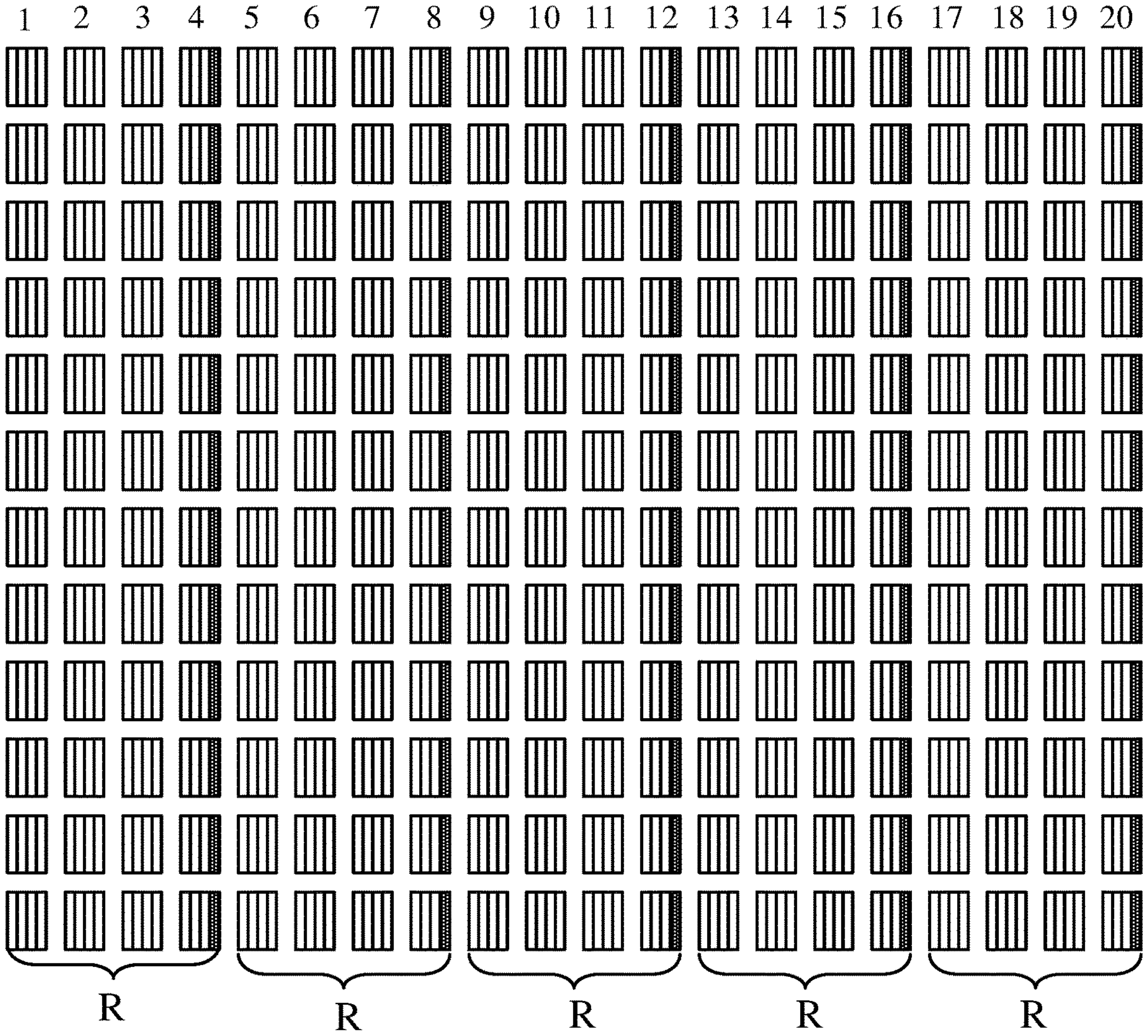
FIG. 3*d* a schematic diagram of lighting sub-pixels corresponding to yet another display frame image to be revised provided by some embodiments of the present disclosure.
Figure 4A:
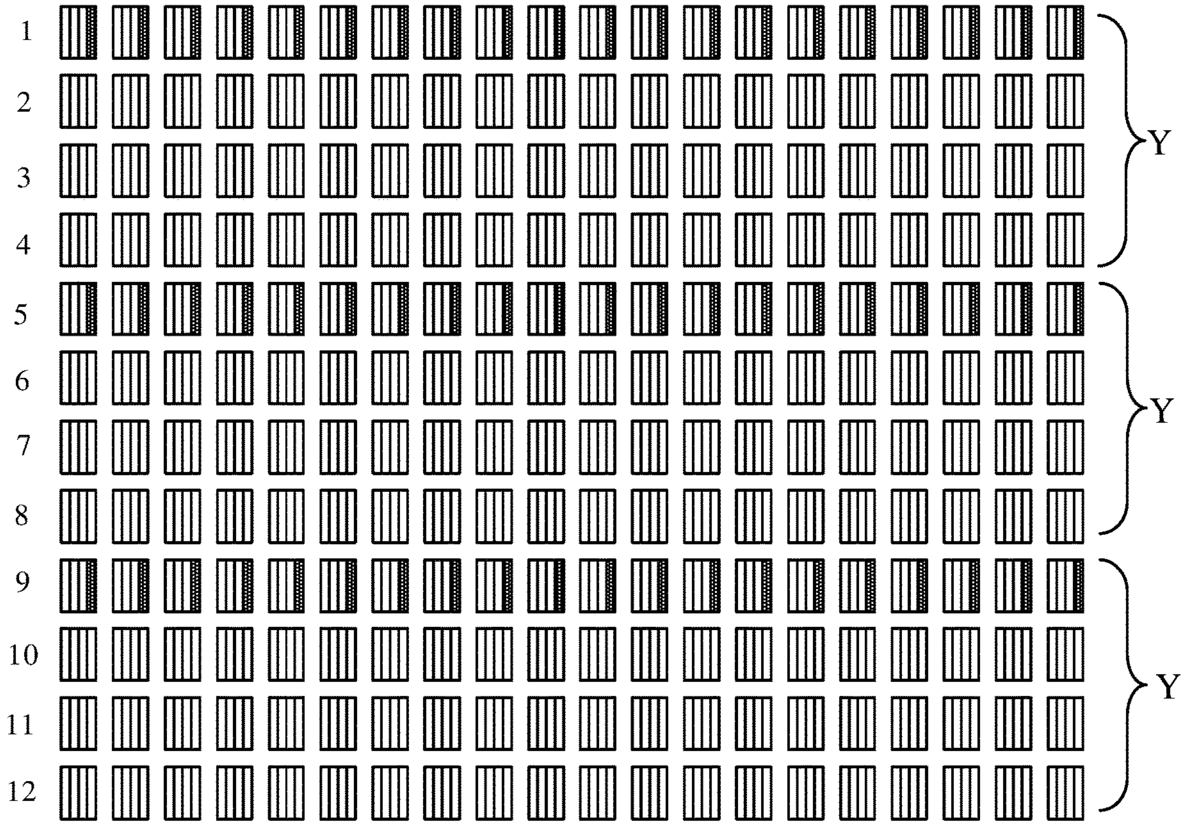
FIG. 4*a* is a schematic diagram of lighting sub-pixels corresponding to a display frame image to be revised provided by some others embodiments of the present disclosure.
Figure 4B:
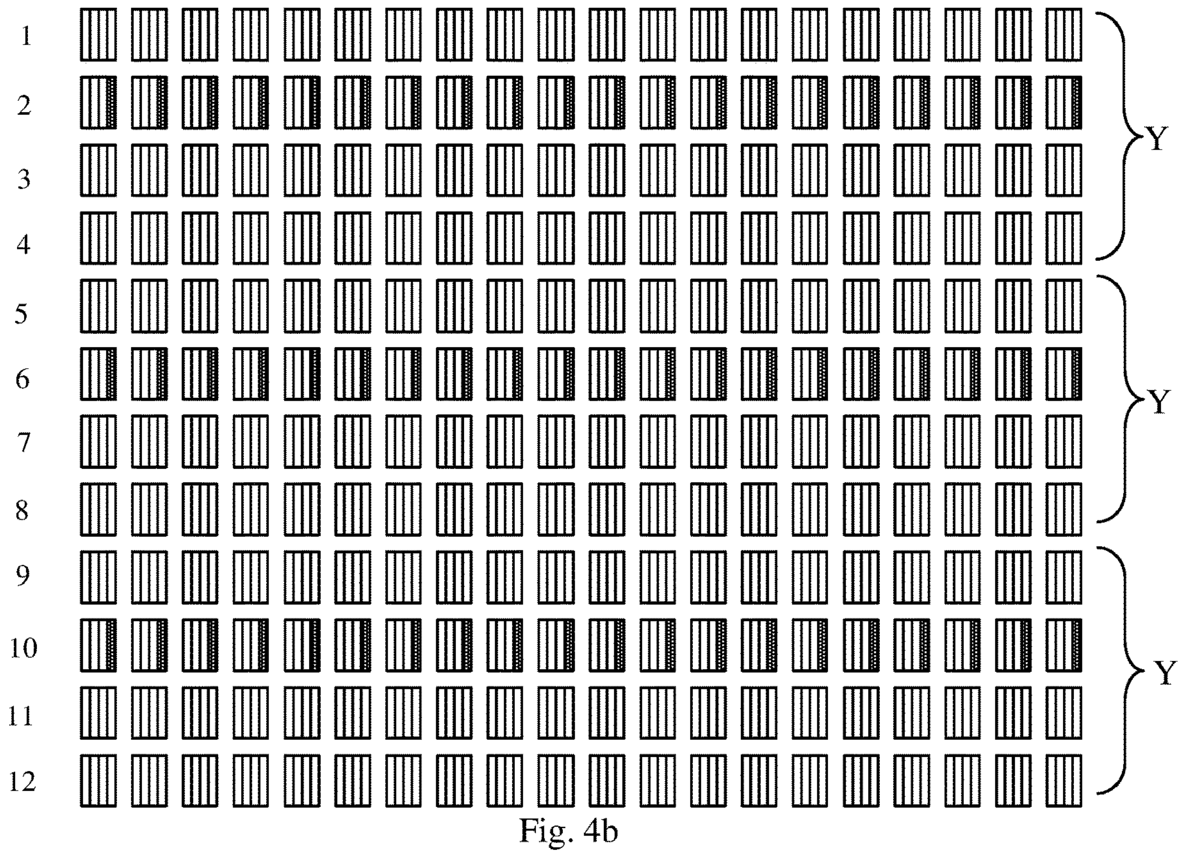
FIG. 4*b* is a schematic diagram of lighting sub-pixels corresponding to another display frame image to be revised provided by some others embodiments of the present disclosure.
Figure 4C:
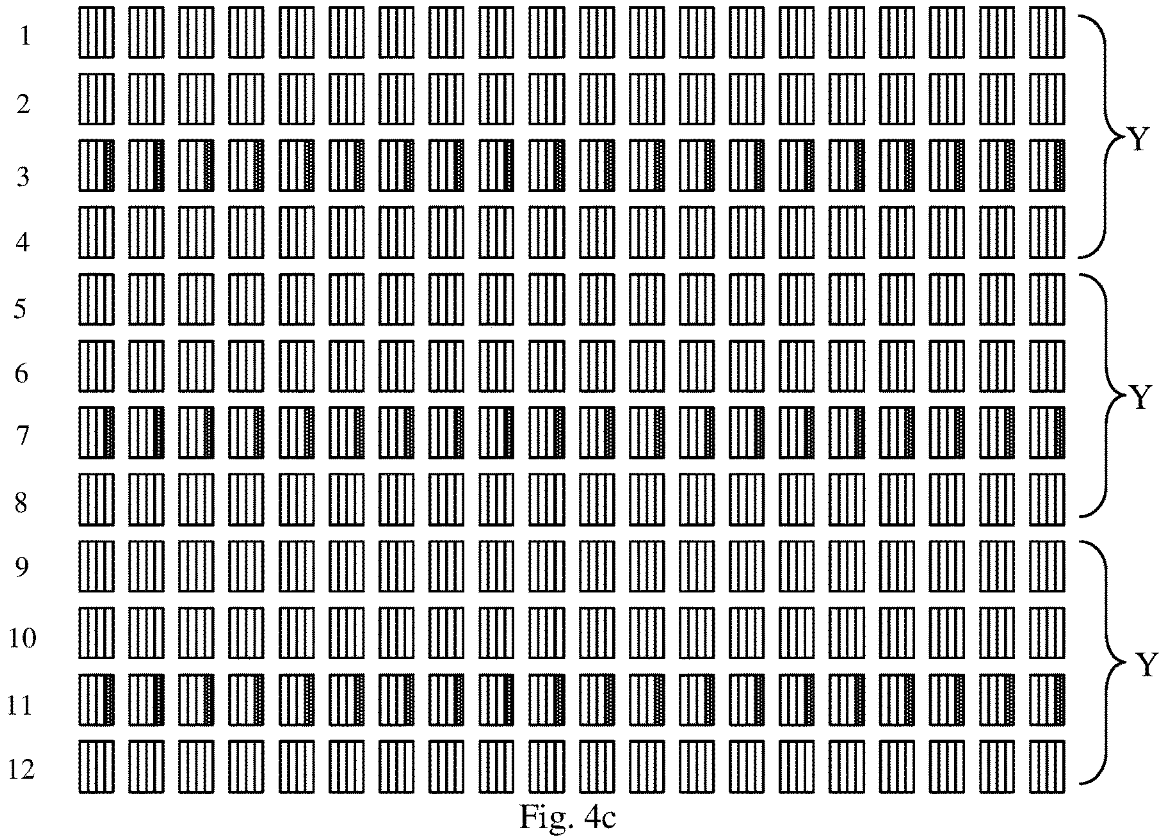
FIG. 4*c* is a schematic diagram of lighting sub-pixels corresponding to still another display frame image to be revised provided by some others embodiments of the present disclosure.
Figure 4D:
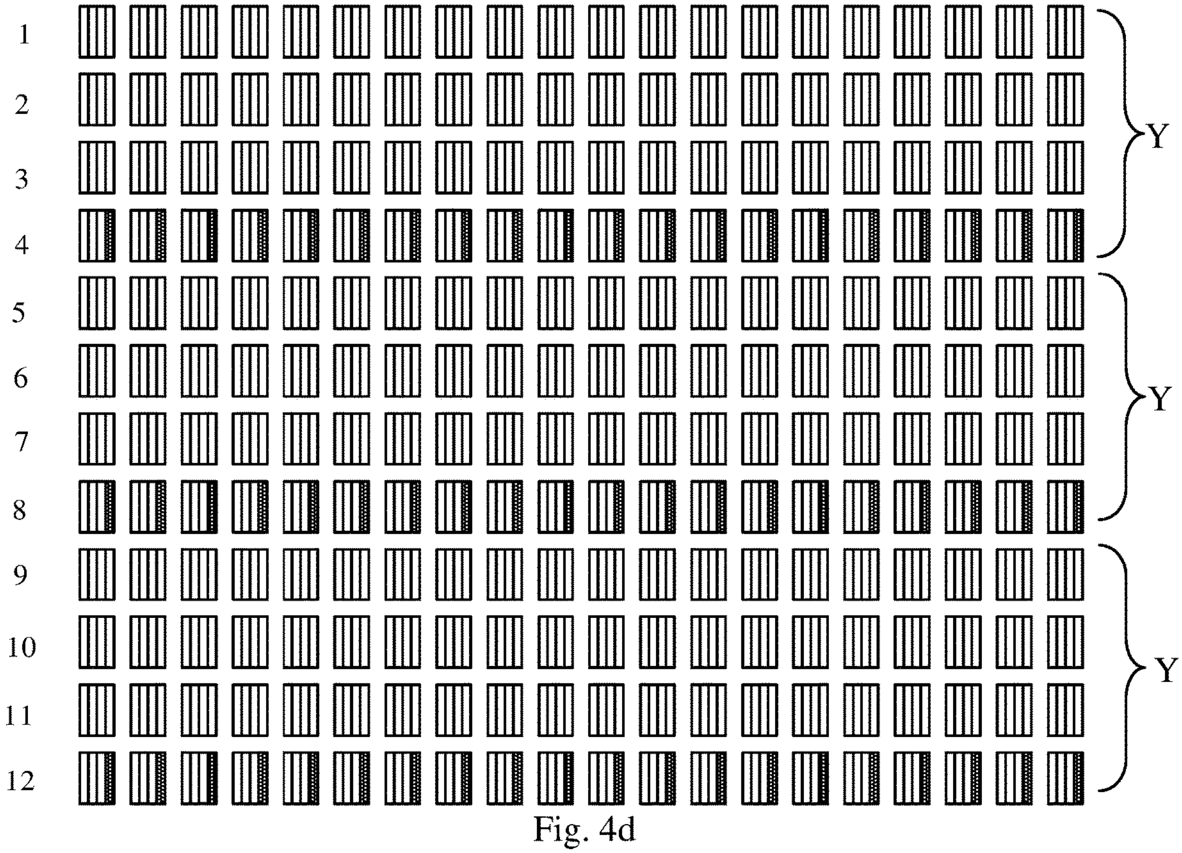
FIG. 4*d* is a schematic diagram of lighting sub-pixels corresponding to yet another display frame image to be revised provided by some others embodiments of the present disclosure.

For example, referring to FIG. 2, the above mentioned step S101 may comprise:

Step S1011, obtaining S initial pixel data of the different primary colors and white initial pixel data of all pixel points in any one display frame image.

Step S1012, in a case where a ratio I of a sum of brightness corresponding to the white initial pixel data of the all pixel points in the one display frame image to a sum of brightness corresponding to the S initial pixel data of the different primary colors and the white initial pixel data of the all pixel points in the one display frame image is greater than or equal to a first threshold value A, determining that the one display frame image is the display frame image to be revised, and then determining the target pixel point in the pixel points of the display frame image to be revised.

For example, in step S1012, the sum of the brightness corresponding to the white initial pixel data of all of the pixel points in the display frame image is expressed as $L_{W1}$ (total), the sum of the brightness corresponding to the S initial pixel data of the different primary colors and the white initial pixel data of all of the pixel points is expressed as $L_{W1}$ (total)+$L_{R1}$ (total)+$L_{G1}$ (total)+$L_{B1}$ (total), for example, $L_{R1}$ (total) represents a sum of brightness corresponding to the red initial pixel data of all of the pixel points, $L_{G1}$ (total) represents a sum of brightness corresponding to the green initial pixel data of all of the pixel points, and $L_{B1}$ (total) represents a sum of brightness corresponding to the blue initial pixel data of all of the pixel points.

For example, the ratio I of the brightness is expressed as:

$$I = \frac{L_{W1}(\text{total})}{L_{W1}(\text{total}) + L_{R1}(\text{total}) + L_{G1}(\text{total}) + L_{B1}(\text{total})}.$$

For example, in step S1012, comparing the ratio I with the first threshold value A, if I is greater than or equal to A, the display frame image is determined as the display frame image to be revised, and the target pixel point in the pixel points of the display frame image to be revised is determined; of course, if I is less than A, the display frame image will not be revised (that is the above pixel data processing is not performed on the display frame image), and can be displayed according to the initial pixel data (that is, the S initial pixel data of the different primary colors and the white initial pixel data) corresponding to all the pixel points in the display frame image.

Herein, it should be noted that, the above ratio I being greater than or equal to the first threshold value A may indicate I>A or I≥A.

For example, the first threshold value A can be greater than or equal to 70%, which can indicate, for example, A≥70%, or A>70%. It should be noted that, the specific value of the first threshold value A is not limited in the embodiments of the present disclosure, and for example, the first threshold value A may also be greater than or equal to 65%.

For example, in order to effectively improve the lifetime of the white sub-pixels, the first threshold value A is greater than or equal to 70%, for example, A=80%. In a case where the ratio I of the sum of the brightness corresponding to the white initial pixel data of all of the pixel points in the display frame image to the sum of the brightness corresponding to the S initial pixel data of the different primary colors and the white initial pixel data of all of the pixel points is less than the first threshold value A (that is, the ratio I is less than 80%), it indicates that the number of the white sub-pixels that are lit up is relatively small in a case where the display frame image is displayed, that is to say, it is considered that in the case where the display frame image is displayed, the extent to which the lifetime of the white sub-pixels is reduced is low, at this time, the replacement display may not be performed, that is, the display frame image is not revised. In a case where the ratio of the sum of the brightness corresponding to the white initial pixel data of all of the pixel points in the display frame image to the sum of the brightness corresponding to the S initial pixel data of the different primary colors and the white initial pixel data of all of the pixel points is greater than or equal to the first threshold value A (that is, the ratio I is greater than or equal to 80%), it indicates that the number of the white sub-pixels that are lit up is relatively large in a case where the display frame image is displayed, that is to say, it is considered that in a case where the display frame image is displayed, the extent to which the lifetime of the white sub-pixels is reduced is high, therefore, in order to effectively improve the lifetime of the white sub-pixels, in this case, the white sub-pixels in the display frame image may not display, and the brightness at which the white sub-pixels display is replaced by the brightness at which other primary color sub-pixels (for example, the red sub-pixels, the green sub-pixels, and the blue sub-pixels) in the display frame image display.

For example, the display frame image to be revised comprises a plurality of target pixel points, and on this basis, in step S101, portion pixel points of the pixel points in the display frame image to be revised are determined as the plurality of target pixel points, or all of the pixel points of the display frame image to be revised are determined as the plurality of target pixel points, which is not limited in the present disclosure, and in practice, the selection and design may be performed as requirements.

In summary, it should be understood that, the determination of the display frame image to be revised in the present disclosure can be determined by comparing the ratio I with the first threshold value A as mentioned above, however the present disclosure is not limited thereto, and in practice, each of the display frame images can also be regarded as the display frame image to be revised directly; or other determination rules may be set, for example, even display frame images are the display frame images to be revised, or odd display frame images are the display frame images to be revised, or the even display frame images and the odd display frame images alternately serve as the display frame images to be revised, and the present disclosure is not limited thereto; of course, in the case where each of the display frame images is regarded as the display frame image to be revised, portion pixel points of the pixel points in the display frame image to be revised should be determined as the target pixel points.

The following embodiments further illustrate the embodiments of the present disclosure by taking a case of determining the display frame image to be revised by comparing the ratio I with the first threshold value A as an example.

On this basis, considering that the white target pixel data in the target pixel point corresponds to the 0 gray scale, that is, the white initial pixel data W1 is equivalently replaced by the red equivalent pixel data R2, the green equivalent pixel data G2, and the blue equivalent pixel data B2, it is equivalent to extending illumination durations of the red sub-pixels, the green sub-pixels, and the blue sub-pixels in the case of displaying, based on this, in order to avoid the problem that the lifetime of the red sub-pixels, the lifetime of the green sub-pixels, and the lifetime of the blue sub-pixels are greatly reduced due to excessively prolonging the illumination durations of the red sub-pixels, the green sub-pixels, and the blue sub-pixels, in practice, portion pixel points of the pixel points in the display frame image to be revised may be determined as the target pixel points to balance the lifetime of the red sub-pixels, the lifetime of the green sub-pixels, the lifetime of the blue sub-pixels, and the lifetime of the white sub-pixels, and then the lifetime of the display device is effectively improved.

For example, in order to ensure the uniformity of the lifetimes of respective sub-pixels, in n continuous display frame images to be revised, positions of target pixel points of different display frame images to be revised are different from each other, and positions of all target pixel points in the n continuous display frame images to be revised are in one-to-one correspondence to positions of all pixel points of a display frame image.

For example, the n continuous display frame images to be revised constitute a display frame group to be revised T, so that in a case where the n continuous display frame images to be revised in the display frame group to be revised T are displayed, each of the pixel points in the display device corresponds to be used as the target pixel point once.

In this case, it should be understood that, in an existing display mode, in the case where the n continuous display frame images to be revised are displayed by the display device, the white sub-pixels in the display device are lit up about n times, in a case where the technical solution in the present disclosure is adopted, in the case where the n continuous display frame images to be revised are displayed by the display device, the white sub-pixel in each pixel point is lit up about (n−1) times, which is equivalent to extending the lifetime of the white sub-pixel in each pixel point by 1/n. For example, if n=4, the lifetime of the white sub-pixel in each pixel point is extended by about 25%.

Herein, it should be noted that, the n continuous display frame images to be revised in a display frame group to be revised T represent: the n continuous display frame images to be revised in the plurality of display frame images to be revised having the target pixel points, and the n continuous display frame images to be revised may be n continuous display frame images, or n non-continuous display frame images, that is to say, a display frame image that is not revised may be between two adjacent display frame images to be revised in the n continuous display frame images to be revised.

Taking n=4 as an example, for ten continuous display frame images, if a first display frame image, a second display frame image, a third display frame image, and a fourth display frame image are display frame images to be revised, then the first display frame image, the second display frame image, the third display frame image, and the fourth display frame image are four continuous display frame images to be revised, and constitute a display frame group to be revised T; if the first display frame image, the fourth display frame image, a sixth display frame image, and a ninth display frame image are the display frame images to be revised, the first display frame image, the fourth display frame image, the sixth display frame image, and the ninth display frame image are four continuous display frame images to be revised, and constitute a display frame group to be revised T.

On this basis, two methods for determining the display frame group to be revised are provided in the following, and in the display frame group to be revised, positions of the target pixel points in different display frame images to be revised are different from each other, and the positions of all target pixel points in the n continuous display frame images to be revised are in one-to-one correspondence to positions of all pixel points in a display frame image.

Taking n=4 as an example, with reference to FIG. 3_a_ to FIG. 4_d_, the display device comprises pixel units arranged in an array of M row×N column; schematically, with reference to an enlarged view of a pixel unit 01 in FIG. 3_a_; a pixel unit 01 comprises a red sub-pixel R, a green sub-pixel G, a blue sub-pixel B, and a white sub-pixel W which are arranged in turn; black sub-pixel frames in FIG. 3_a_ to FIG. 4_d_ represent that the white sub-pixels are not lit up (that is, 0 gray scale, a dark state), and it should be understood that, the pixel unit having the black sub-pixel frame corresponds to the target pixel point; of course, it should be understood that, in the embodiments of the present disclosure, the i, j, M, N, n are all positive integers and the K is a natural number.

For example, in some embodiments, determining portion pixel points of the pixel points in the display frame image to be revised as the plurality of target pixel points comprises: determining all pixel points located in a (i+n*k)-th column of an i-th display frame image to be revised in the display frame group to be revised as a plurality of target pixel points corresponding to the i-th display frame image to be revised, in which, $$k = \left\{0, 1, 2 \ldots \left\lceil \frac{N-n}{n} \right\rceil\right\},$$

1≤i+n*k≤N, 1≤i≤n, N is a total number of pixel point columns in the i-th display frame image to be revised.

It should be noted that, represents taking integer number in an up direction, that is, in a case where [(N−n)/n] is a decimal, the smallest integer larger than the decimal is taken.

For example, taking N=20 and n=4 as an example, that is, in this case, the display device comprises 80 pixel point columns, and each display frame group to be revised T comprises four continuous display frame images to be revised, with reference to FIG. 3_a_, FIG. 3_b_, FIG. 3_c_, and FIG. 3_d_, in the four continuous display frame images to be revised in the display frame group to be revised T, all pixel points located in the (i+4*k)-th pixel point column in the i-th display frame image to be revised are determined as the target pixel points, in which k={0, 1, 2, 3, 4}.

For example, as shown in FIG. 3_a_ to FIG. 3_d_, each display frame image to be revised may comprise a plurality of pixel column groups R, and each of the pixel column groups R comprises four pixel point columns.

For example, in a case where a first display frame image to be revised is displayed, all pixel points in a first pixel point column, a fifth pixel point column, a ninth pixel point column, a thirteenth pixel point column, and a seventeenth pixel point column are determined as the target pixel points (with reference to FIG. 3_a_, the white sub-pixels in all pixel points of the first pixel point column, the fifth pixel point column, the ninth pixel point column, the thirteenth pixel point column, and the seventeenth pixel point column are in a dark state), that is, all pixel points in the first pixel point column of each of the pixel column groups R are determined as the target pixel points.

For example, in a case where a second display frame image to be revised is displayed, all pixel points in a second pixel point column, a sixth pixel point column, a tenth pixel point column, a fourteenth pixel point column, and a eighteenth pixel point column are determined as the target pixel points (with reference to FIG. 3_b_, the white sub-pixels in all pixel points of the second pixel point column, the sixth pixel point column, the tenth pixel point column, the fourteenth pixel point column, and the eighteenth pixel point column are in a dark state), that is, all pixel points in the second pixel point column of each of the pixel column groups R are determined as the target pixel points.

For example, in a case where a third display frame image to be revised is displayed, all pixel points in a third pixel point column, a seventh pixel point column, an eleventh pixel point column, a fifteenth pixel point column, and a nineteenth pixel point column are determined as the target pixel points (with reference to FIG. 3_c_, the white sub-pixels in all pixel points of the third pixel point column, the seventh pixel point column, the eleventh pixel point column, the fifteenth pixel point column, and the nineteenth pixel point column are in a dark state), that is, all pixel points in the third pixel point column of each of the pixel column groups R are determined as the target pixel points.

For example, in a case where a fourth display frame image to be revised is displayed, all pixel points in a fourth pixel point column, an eighth pixel point column, a twelfth pixel point column, a sixteenth pixel point column, and a twentieth pixel point column are determined as the target pixel points (with reference to FIG. 3_d_, the white sub-pixels in all pixel points of the fourth pixel point column, the eighth pixel point column, the twelfth pixel point column, the sixteenth pixel point column, and the twentieth pixel point column are in a dark state), that is, all pixel points in the fourth pixel point column of each of the pixel column groups R are determined as the target pixel points.

For example, in other embodiments, determining portion pixel points of the pixel points in the display frame image to be revised as the plurality of target pixel points comprises: determining all pixel points located in a (j+n*k)-th pixel point row in a j-th display frame image to be revised in the display frame group to be revised as a plurality of target pixel points corresponding to the j-th display frame image to be revised, in which $$k=\left\{0,1,2\ \ldots\ \left\lceil\frac{M-n}{n}\right\rceil\right\},$$

1≤j+n*k≤M, 1≤j≤n, M is a total number of pixel point rows in the j-th display frame image to be revised.

For example, taking M=12 and n=4 as an example, that is, in this case, the display device comprises 12 pixel point rows, and each display frame group to be revised T comprises four continuous display frame images to be revised, with reference to FIG. 4*a*, FIG. 4*b*, FIG. 4*c*, and FIG. 4*d*, in the four continuous frame images to be revised in the display frame group to be revised T, all pixel points located in the (j+4*k) pixel point row in j-th display frame image to be revised are determined as the target pixel points, in which k={0, 1, 2}.

For example, as illustrated in FIG. 4*a* to FIG. 4*d*, each display frame image to be revised may comprise a plurality of pixel row groups Y, and each of the pixel row groups Y comprises four pixel point rows.

For example, in a case where the first display frame image to be revised is displayed, all pixel points in a first pixel point row, a fifth pixel point row, and a ninth pixel point row are determined as the target pixel points (with reference to FIG. 4*a*, the white sub-pixels in all pixel points of the first pixel point row, the fifth pixel point row, and the ninth pixel point row are in a dark state), that is, all pixel points in the first pixel point row of each of the pixel row groups Y are determined as the target pixel points.

For example, in a case where the second display frame image to be revised is displayed, all pixel points in a second pixel point row, a sixth pixel point row, and a tenth pixel point row are determined as the target pixel points (with reference to FIG. 4*b*, the white sub-pixels in all pixel points of the second pixel point row, the sixth pixel point row, and the tenth pixel point row are in a dark state), that is, all pixel points in the second pixel point row of each of the pixel row groups Y are determined as the target pixel points.

For example, in a case where the third display frame image to be revised is displayed, all pixel points in a third pixel point row, a seventh pixel point row, and an eleventh pixel point row are determined as the target pixel points (with reference to FIG. 4*c*, the white sub-pixels in all pixel points of the third pixel point row, the seventh pixel point row, and the eleventh pixel point row are in a dark state), that is, all pixel points in the third pixel point row of each of the pixel row groups Y are determined as the target pixel points.

For example, in a case where the fourth display frame image to be revised is displayed, all pixel points in a fourth pixel point row, an eighth pixel point row, and a twelfth pixel point row are determined as the target pixel points (with reference to FIG. 4*d*, the white sub-pixels in all pixel points of the fourth pixel point row, the eighth pixel point row, and the twelfth pixel point row are in a dark state), that is, all pixel points in the fourth pixel point row of each of the pixel row groups Y are determined as the target pixel points.

Of course, the above is only to schematically determine the pixel points in each row in each of the display frame groups to be revised T by a row-by-row method or the pixel points in each column in each of the display frame groups to be revised T by a column-by-column method as the target pixel points, and the present disclosure is not limited thereto, and the order can also be adjusted.

Figure 5:
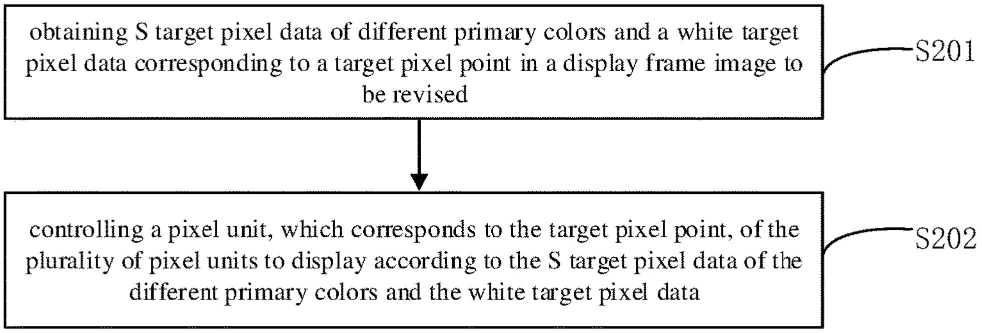
FIG. 5 is a flowchart of a display method of a display device provided by some embodiments of the present disclosure.

At least one embodiment of the present disclosure also provides a display method of a display device. FIG. 5 is a flowchart of a display method of a display device provided by some embodiments of the present disclosure.

For example, the display device comprises a plurality of pixel units, each of the pixel units comprises S primary color sub-pixels and a white sub-pixel, and S is a positive integer.

For example, as illustrated in FIG. 5, the display method comprises:

Step S201, obtaining S target pixel data of different primary colors and a white target pixel data corresponding to a target pixel point in a display frame image to be revised.

Step S202, controlling a pixel unit, which corresponds to the target pixel point, of the plurality of pixel units to display according to the S target pixel data of the different primary colors and the white target pixel data.

For example, in step S201, the S target pixel data of the different primary colors and the white target pixel data can be obtained by the processing method for pixel data described in any one of the above embodiments.

For example, in some embodiments of the present disclosure, the S primary color sub-pixels are different from each other, that is, the S primary color sub-pixels respectively display different colors. For example, the S primary color sub-pixels comprise a red sub-pixel, a green sub-pixel, and a blue sub-pixel.

For example, the S primary color sub-pixels are in one-to-one correspondence with the S target pixel data of the different primary colors, and the white sub-pixel corresponds to the white initial pixel data. For example, the S target pixel data of the different primary colors comprise a red target pixel data, a green target pixel data, and a blue target pixel data, the red sub-pixel corresponds to the red target pixel data, the green sub-pixel corresponds to the green target pixel data, and the blue sub-pixel corresponds to the blue target pixel data, that is to say, the red target pixel data is the target pixel data of the red sub-pixel, the green target pixel data is the target pixel data of the green sub-pixel, and the blue target pixel data is the target pixel data of the blue sub-pixel.

For example, in some embodiments, the display method comprises:

Step S301, obtaining a plurality of target pixel data groups corresponding to a plurality of target pixel points respectively, in which each target pixel data group of the plurality of target pixel data groups comprises S target pixel data of the different primary colors and a white target pixel data, the S target pixel data of the different primary colors and the white target pixel data in each target pixel data group may be obtained by the processing method for pixel data according to any one of the above embodiments.

Step S302, in a case where all pixel points in the display frame image to be revised are the plurality of target pixel points, controlling each pixel unit to display according to S target pixel data of the different primary colors and a white target pixel data in a target pixel point corresponding to each pixel unit, or, in a case where portion pixel points of the pixel points in the display frame image to be revised are the plurality of target pixel points, controlling each pixel unit in pixel units, which correspond to the plurality of target pixel points, to display according to corresponding S target pixel data of the different primary colors and a corresponding white target pixel data, obtaining a plurality of initial pixel data groups corresponding to pixel points other than the plurality of target pixel points, in which each of the initial pixel data groups comprises S initial pixel data of the different primary colors and a white initial pixel data, and controlling each pixel unit of a plurality of pixel units, which correspond to the pixel points other than the plurality of target pixel points, to display according to the corresponding S initial pixel data of the different primary colors and the corresponding white initial pixel data.

For example, in some embodiments, the display frame image to be revised may comprise a plurality of target pixel points and a plurality of non-target pixel points, and the plurality of pixel units comprise a first group of pixel units and a second group of pixel units, pixel units in the first group of the pixel units are in one-to-one correspondence to the plurality of target pixel points, that is, each of the pixel units in the first group of the pixel units comprises a target pixel point; pixel units in the second group of the pixel units are in one-to-one correspondence to the plurality of non-target pixel points, that is, each of the pixel units in the second group of the pixel units comprises a non-target pixel point. It should be noted that, the non-target pixel points represent the pixel points that normally display according to the initial pixel data, that is, the S primary color sub-pixels and the white sub-pixel in the non-target pixel point all display, for example, in FIG. 3*a*, all the pixel points in the second pixel point column, the third pixel point column, the fourth pixel point column, the sixth pixel point column, the seventh pixel point column, the eighth pixel point column, the tenth pixel point column, the eleventh pixel point column, the twelfth pixel point column, the fourteenth pixel point column, the fifteenth pixel point column, the sixteenth pixel point column, the eighteenth pixel point column, the nineteenth pixel point column, and the twentieth pixel point column are non-target pixel points.

For example, in a case where portion pixel points of the pixel points in the display frame image to be revised are the plurality of target pixel points, the step S302 comprises: controlling each of the pixel units in the first group of the pixel units to display according to the S target pixel data of the different primary colors and the white target pixel data of the corresponding target pixel point; obtaining a plurality of initial pixel data groups corresponding to the plurality of non-target pixel points respectively, in which each of the initial pixel data groups comprises S initial pixel data of the different primary colors and one white initial pixel data; controlling each of the pixel units in the second group of the pixel units to display according to the S initial pixel data of the different primary colors and the white initial pixel data of the corresponding non-target pixel point.

In the display method of the display device, the processing method for pixel data provided by any one of the above embodiments is used to obtain the S target pixel data of the different primary colors and the white target pixel data of the target pixel point in the display frame image to be revised, in the case where the display device displays, the white target pixel data corresponds to the 0 gray scale (that is, a sub-pixel corresponding to the white target pixel data is not lit up), the display effect of the target pixel point can be achieved only by S sub-pixels in the target pixel point displaying according to the S target pixel data of the different primary colors respectively, the display effect is the same as a display effect of the S sub-pixels in the target pixel point respectively displaying according to the S initial pixel data of the different primary colors and the white sub-pixel in the target pixel point displaying according to the white initial pixel data, and thus, the lighting time of the white sub-pixel corresponding to the white target pixel data is reduced, and the problem that the lifetime of the display device is lowered due to the excessive lighting time of the white sub-pixel is solved.

At least one embodiment of the present disclosure also provides a computer readable storage medium, and the computer readable storage medium is used for storing a computer program, in a case where the computer program is executed by a computer, the processing method according to any one of the embodiments mentioned above is achieved.

For example, the computer readable storage medium may be any storage medium that a computer can access, or a data storage device such as a server that contains one or more storage medium integrations, a data center, and so on. The computer readable storage medium may be a volatile memory and/or a non-volatile memory. The volatile memory may comprise, for example, a random access memory (RAM) and/or a high-speed buffer memory (cache), or the like. The non-volatile memory may comprise, for example, a read-only memory (ROM), a hard disk, an erasable programmable read-only memory (EPROM), a portable compact disk read-only memory (CD-ROM), a USB memory, a flash memory, and so on. One or more non-temporary computer readable instructions can be stored in the computer readable storage medium, and the computer can execute the non-temporary computer readable instructions to implement one or more steps in the processing method for pixel data.

At least one embodiment of the present disclosure also provides a processing device for pixel data, and the processing device for pixel data comprises a memory and a processor; a computer program that can be executed on a processor is stored in the memory, and the processor is used to execute the computer program to implement the processing method for pixel data in any one of the embodiments mentioned above.

For example, the memory may comprise a volatile memory and/or a non-volatile memory. The volatile memory may comprise, for example, a random access memory (RAM) and/or a high-speed random access memory (cache), or the like. The non-volatile memory may comprise, for example, a read-only memory (ROM), a hard disk, an erasable programmable read-only memory (EPROM), a portable compact disk read-only memory (CD-ROM), a USB memory, a flash memory, or other volatile solid-state memory devices.

For example, the processor can be a central processing unit (CPU), a general purpose processor, a digital signal processor (DSP), an application-specific integrated circuit (ASIC), a field programmable gate array (FPGA), or other programmable logic devices, transistor logic devices, hardware components, or any combination thereof. The processor may implement or execute various illustrative logic blocks, modules, and circuits described in connection with the disclosed contents of the present disclosure. The processor may also be a combination of computing functions, such as a combination of one or more microprocessors, a combination of DSPs and microprocessors, and so on.

Figure 6:
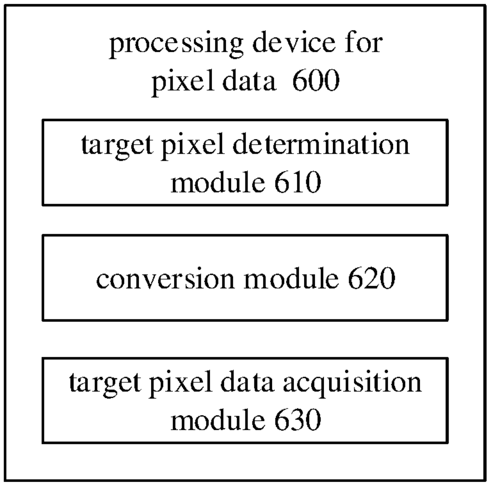
FIG. 6 is a schematic block diagram of a processing device for pixel data provided by some embodiments of the present disclosure.

At least one embodiment of the present disclosure further provides another processing device for pixel data, and FIG. 6 is a schematic block diagram of a processing device for pixel data provided by some embodiments of the present disclosure.

For example, as illustrated in FIG. 6, the processing device for pixel data 600 comprises:

a target pixel determination module 610, which is configured to determine a target pixel point in pixel points of a display frame image to be revised, in which a pixel data of each of the pixel points comprises S initial pixel data of different primary colors and a white initial pixel data, and S is a positive integer;

a conversion module 620, which is configured to convert a white initial pixel data in a pixel data of the target pixel point into S equivalent pixel data of the different primary colors;

a target pixel data acquisition module 630, which is configured to obtain S target pixel data of the different primary colors and a white target pixel data of the target pixel point according to the S equivalent pixel data of the different primary colors in the pixel data of the target pixel point and according to S initial pixel data of the different primary colors in the pixel data of the target pixel point, in which the white target pixel data corresponds to a 0 gray scale.

For example, the target pixel determination module 610 may comprise an initial pixel data acquisition unit and a position determination unit.

For example, the initial pixel data acquisition unit is used to obtain S initial pixel data of the different primary colors and white initial pixel data of all pixel points in any one display frame image.

For example, in a case where a ratio of a sum of brightness corresponding to the white initial pixel data of all of the pixel points in a display frame image to a sum of brightness corresponding to S initial pixel data of the different primary colors and the white initial pixel data of all of the pixel points in the display frame image is greater than or equal to a first threshold value, the position determination unit is used to determine that the display frame image is the display frame image to be revised, and determine the target pixel point in the pixel points of the display frame image to be revised.

For example, in some embodiments, the display frame image to be revised comprises a plurality of target pixel points, and the position determination unit may determine portion pixel points of the all pixel points in the display frame image to be revised as the plurality of target pixel points.

For example, n continuous display frame images to be revised constitute a display frame group to be revised; in the display frame group to be revised, positions of target pixel points of different display frame image to be revised are different from each other, and positions of all target pixel points in the n continuous display frame images to be revised are in one-to-one correspondence to positions of all target pixel points of a display frame image.

For example, the position determination unit may comprise a frame counter and a data processor.

For example, in some embodiments, the frame counter can count the number of the display frame images to be revised in the display frame group to be revised; on this basis, according to a counting result X of the frame counter, the data processor determines all pixel points located in a (i+n*k)-th pixel point column of an i-th display frame image to be revised in the display frame group to be revised as a plurality of target pixel points corresponding to the i-th display frame image to be revised, in which $$k = \left\{0, 1, 2 \ldots \left\lceil \frac{N-n}{n} \right\rceil \right\},$$

$1 \le i+n*k \le N$, $1 \le i \le n$, N is a total number of pixel point columns in the i-th display frame image to be revised.

For example, in some other embodiments, the frame counter can count the number of the display frame images to be revised in the display frame group to be revised; on this basis, according to a counting result X of the frame counter, the data processor determines all pixel points located in a (j+n*k)-th pixel point row of a j-th display frame image to be revised in the display frame group to be revised as a plurality of target pixel points corresponding to the j-th display frame image to be revised, in which $$k = \left\{0, 1, 2 \ldots \left\lceil \frac{M-n}{n} \right\rceil \right\},$$

$1 \le j+n*k \le M$, $1 \le j \le n$, M is a total number of pixel point rows in the j-th display frame image to be revised.

For example, in some embodiments, the target pixel data acquisition module 630 is used for superimposing the S equivalent pixel data of the different primary colors and the S initial pixel data of the different primary colors respectively to obtain the S target pixel data of the different primary colors and the white target pixel data.

It should be noted that, firstly, other relevant contents (for example, beneficial effects, correlation analysis explanation, and so on) of the relevant modules in the processing device for pixel data can refer to the corresponding parts in the above embodiments of the processing method for pixel data, and similar description will be omitted here; other related processing methods of the above mentioned processing method for pixel data can refer to the above mentioned processing device for pixel data, and the corresponding module structure can be adjusted, and details are not described herein again.

Secondly, the counting method of the frame counter mentioned above is not limited. The frame counter can count by sequentially increasing by 1 or decreasing by 1 in turn; after the counting result X is counted up to n, the counting result X can be reset, and the counting can be restarted. At this time, i=X; the counting method can be a cumulative counting, the present disclosure is not limited thereto. In practice, an appropriate counting method can be selected according to requirements.

Thirdly, by the descriptions of the above embodiments, those skilled in the art can clearly understand that in order to describe conveniently and concisely, the embodiment of the present disclosure is illustrated only by taking the division of the above functional modules as an example. In practical application, the above functions can be achieved by different functional modules according to requirements, that is, internal structures of the device are divided into different functional modules to complete all or part of the functions described above. The specific working processes of the devices, the modules, and the units described above may refer to the corresponding processes in the embodiments of the method described above, and details are not described herein again.

An embodiment of the present disclosure further provides a display device, and the display device comprises a plurality of pixel units, each of the pixel units comprises S primary color sub-pixels and a white sub-pixel, and the display device further comprises any one of the processing devices for pixel data provided in the embodiments mentioned above.

Figure 7:
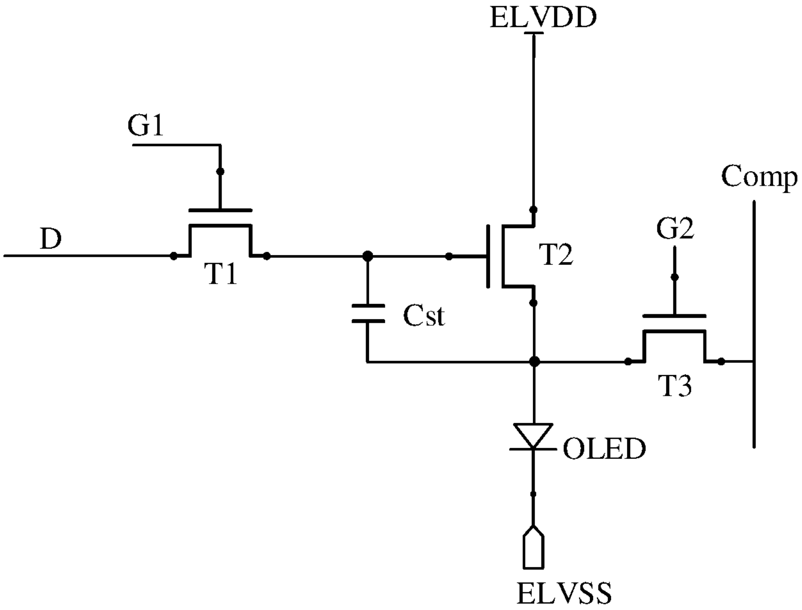
FIG. 7 is a schematic diagram of a pixel driving circuit provided by some embodiments of the present disclosure.

For example, as illustrated in FIG. 7, each of the sub-pixels is provided with a pixel driving circuit, and the pixel driving circuit may comprise a data writing transistor T1, a driving transistor T2, a storage capacitor Cst, and a sensing transistor T3, a first electrode of the data writing transistor T1 is electrically connected with a data line D, a second electrode of the data writing transistor T1 is electrically connected with a gate electrode of the driving transistor T2 and a first end of the storage capacitor Cst, and a gate electrode of the data writing transistor T1 is electrically connected with a gate line G1, a first electrode of the driving transistor T2 is electrically connected with a first power source terminal (ELVDD), a second electrode of the driving transistor T2 is electrically connected with a first electrode of a light emitting element OLED, and a second end of the storage capacitor Cst is electrically connected with the second electrode of the driving transistor T2, a second electrode of the light emitting element OLED is electrically connected with a second power source terminal (ELVSS), a first electrode of the sensing transistor T3 is electrically connected with the second electrode of the driving transistor T2, a second electrode of the sensing transistor T3 is electrically connected with a sensing signal line Comp, and a gate electrode of the sensing transistor T3 is electrically connected with a sensing control line G2.

For example, the sensing transistor T3 is configured to transmit a current to the sensing signal line Comp to charge the sensing signal line Comp; the driving transistor T2 is configured to drive the light emitting element OLED to emit light; and the data writing transistor T1 is configured to write pixel data to the gate electrode of the corresponding driving transistor T2 in a case where the data writing transistor T1 is turned on; the storage capacitor Cst is configured to store the pixel data and hold the pixel data at the gate electrode of the driving transistor T2.

For example, each of the data writing transistors T1, the driving transistor T2, and the sensing transistor T3 can be a thin film transistor or a field effect transistor or other switching device with the same characteristics. The thin film transistor comprises a polycrystalline silicon (low temperature polycrystalline silicon or high temperature polycrystalline silicon) thin film transistor, an amorphous silicon thin film transistor, an oxide thin film transistor, or an organic thin film transistor, and so on.

For example, the target pixel data (for example, the target pixel data comprises S target pixel data of the different primary colors and a white target pixel data) obtained after being processed by the processing device for pixel data can be input to the gate electrode of the driving transistor T2 through the data line D (in a case where the data writing transistor T1 is turned on) to drive the light emitting element OLED to emit light, thereby achieving display.

Of course, FIG. 5 is only a schematic diagram of a pixel driving circuit, but the specific structure of the pixel driving circuit is not limited in the present disclosure. Appropriate pixel driving circuits can be selected according to the actual requirements. The pixel driving circuit shown in FIG. 5 is illustrated by taking a 3T1C structure as an example. However, the pixel driving circuit in the embodiment of the present disclosure is not limited to the 3T1C structure. For example, the pixel driving circuit may also comprise a transfer transistor, a detection transistor, a reset transistor, and so on, as required.

It should also be noted that, in the embodiments of the present disclosure, the display device may specifically comprise at least an organic light-emitting diode display panel, but the present disclosure is not limited thereto, for example, alternatively, the display device may comprise a quantum dot light-emitting display panel. The display panel can be applied to any products or components with a display function, such as a display, a TV, a digital photo frame, a mobile phone, or a tablet computer.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A processing method for pixel data, comprising:

determining a target pixel point in pixel points of a display frame image to be revised to prolong the lifetime of white sub-pixels, wherein a pixel data of each of the pixel points comprises S initial pixel data of different primary colors and a white initial pixel data, the S initial pixel data of different primary colors corresponds to S primary colors respectively, the white initial pixel data corresponds to white, and S is a positive integer;

converting only a white initial pixel data in a pixel data of the target pixel point into S equivalent pixel data of the different primary colors, wherein a brightness of the white initial pixel data in the pixel data of the target pixel point during display is the same as a brightness of the S equivalent pixel data of the different primary colors during display, a display effect of the white initial pixel data in the pixel data of the target pixel point during display is the same as a display effect of the S equivalent pixel data of the different primary colors during display, and the white initial pixel data in the pixel data of the target pixel point is not related to S initial pixel data of the different primary colors in the pixel data of the target pixel point; and obtaining S target pixel data of the different primary colors and a white target pixel data of the target pixel point according to the S equivalent pixel data of the different primary colors and according to the S initial pixel data of the different primary colors in the pixel data of the target pixel point, wherein the white target pixel data corresponds to a 0 gray scale when the white initial pixel data corresponds to a non-zero gray scale, wherein the obtaining the S target pixel data of the different primary colors and the white target pixel data of the target pixel point according to the S equivalent pixel data of the different primary colors and according to the S initial pixel data of the different primary colors in the pixel data of the target pixel point comprises:

superimposing the S equivalent pixel data of the different primary colors and the S initial pixel data of the different primary colors in the pixel data of the target pixel point respectively to obtain the S target pixel data of the different primary colors; and determining the white target pixel data to be 0 gray scale.

2. The processing method according to claim 1, wherein the determining the target pixel point in the pixel points of the display frame image to be revised comprises:

obtaining S initial pixel data of the different primary colors and white initial pixel data of all pixel points in any one display frame image; and in a case where a ratio of a sum of brightness corresponding to the white initial pixel data of the all pixel points in the one display frame image to a sum of brightness corresponding to the S initial pixel data of the different primary colors and the white initial pixel data of the all pixel points in the one display frame image is greater than or equal to a first threshold value, determining that the one display frame image is the display frame image to be revised, and then determining the target pixel point in the pixel points of the display frame image to be revised.

3. The processing method according to claim 2, wherein the first threshold value is greater than or equal to 70%.

4. The processing method according to claim 2, wherein the display frame image to be revised comprises a plurality of target pixel points, the determining the target pixel point in the pixel points of the display frame image to be revised comprises:

determining portion pixel points of the pixel points in the display frame image to be revised as the plurality of target pixel points.

5. The processing method according to claim 4, wherein n continuous display frame images to be revised constitute a display frame group to be revised, and n is a positive integer; and in the display frame group to be revised, positions of target pixel points of different display frame images to be revised are different from each other.

6. The processing method according to claim 5, wherein the determining the portion pixel points of the pixel points in the display frame image to be revised as the plurality of target pixel points comprises:

determining all pixel points located in an (i+n*k)-th pixel point column in an i-th display frame image to be revised in the display frame group to be revised as a plurality of target pixel points corresponding to the i-th display frame image to be revised, wherein i is a positive integers, k is a natural number, $$k = \left\{0, 1, 2 \ldots \left\lceil \frac{N-n}{n} \right\rceil\right\},$$

$1 \le i+n*k \le N$, $1 \le i \le n$, N is a total number of pixel point columns in the i-th display frame image to be revised.

7. The processing method according to claim 5, wherein the determining the portion pixel points of the pixel points in the display frame image to be revised as the plurality of target pixel points comprises:

determining all pixel points located in a (j+n*k)-th pixel point row in a j-th display frame image to be revised in the display frame group to be revised as a plurality of target pixel points corresponding to the j-th display frame image to be revised, wherein j is a positive integers, k is a natural number, $$k = \left\{0, 1, 2 \ldots \left\lceil \frac{M-n}{n} \right\rceil\right\},$$

$1 \le j+n*k \le M$, $1 \le j \le n$, M is a total number of pixel point rows in the j-th display frame image to be revised.

8. The processing method according to claim 1, wherein the display frame image to be revised comprises a plurality of target pixel points, the determining the target pixel point in the pixel points of the display frame image to be revised comprises:

determining portion pixel points of the pixel points in the display frame image to be revised as the plurality of target pixel points.

9. The processing method according to claim 8, wherein n continuous display frame images to be revised constitute a display frame group to be revised, and n is a positive integer; and in the display frame group to be revised, positions of target pixel points of different display frame images to be revised are different from each other.

10. The processing method according to claim 9, wherein positions of all target pixel points in the n continuous display frame images to be revised are in one-to-one correspondence to positions of all pixel points of a display frame image.

11. The processing method according to claim 9, wherein the determining the portion pixel points of the pixel points in the display frame image to be revised as the plurality of target pixel points comprises:

determining all pixel points located in an (i+n*k)-th pixel point column in an i-th display frame image to be revised in the display frame group to be revised as a plurality of target pixel points corresponding to the i-th display frame image to be revised, wherein i is a positive integers, k is a natural number, $$k = \left\{0, 1, 2 \ldots \left\lceil \frac{N-n}{n} \right\rceil\right\},$$

$1 \le i+n*k \le N$, $1 \le i \le n$, N is a total number of pixel point columns in the i-th display frame image to be revised.

12. The processing method according to claim 9, wherein the determining the portion pixel points of the pixel points in the display frame image to be revised as the plurality of target pixel points comprises:

determining all pixel points located in a (j+n*k)-th pixel point row in a j-th display frame image to be revised in the display frame group to be revised as a plurality of target pixel points corresponding to the j-th display frame image to be revised, wherein j is a positive integers, k is a natural number, $$k = \left\{0, 1, 2 \ldots \left\lceil \frac{M-n}{n} \right\rceil\right\},$$

$1 \le j+n*k \le M$, $1 \le j \le n$, M is a total number of pixel point rows in the j-th display frame image to be revised.

13. A display method of a display device, wherein the display device comprises a plurality of pixel units, and the display method comprises:

obtaining a plurality of target pixel data groups corresponding to a plurality of target pixel points respectively, wherein each target pixel data group in the plurality of target pixel data groups comprises S target pixel data of different primary colors and a white target pixel data, and the S target pixel data of the different primary colors and the white target pixel data in each target pixel data group are obtained by the processing method for pixel data according to claim 1;

in a case where all pixel points in the display frame image to be revised are the plurality of target pixel points, controlling each pixel unit of the plurality of pixel units to display according to S target pixel data of the different primary colors and a white target pixel data in a target pixel data group corresponding to a target pixel point corresponding to the each pixel unit, or, in a case where portion pixel points of the all pixel points in the display frame image to be revised are the plurality of target pixel points, controlling each pixel unit in a first group of pixel units, corresponding to the plurality of target pixel points, of the plurality of pixel units to display according to S target pixel data of the different primary colors and a white target pixel data in a target pixel data group corresponding to a target pixel corresponding to the each pixel unit in the first group of pixel units;

obtaining a plurality of initial pixel data groups corresponding to pixel points, other than the plurality of target pixel points, in the all pixel points in the display frame image to be revised, wherein each of the plurality of initial pixel data groups comprises S initial pixel data of the different primary colors and a white initial pixel data; and controlling each pixel unit in a second group of pixel units, which correspond to the pixel points other than the plurality of target pixel points, of the plurality of pixel units to display according to S initial pixel data of the different primary colors and a white initial pixel data in an initial pixel data group corresponding to a pixel point corresponding to the each pixel unit of the second group of pixel units.

14. A processing device for pixel data, comprising: a memory; and a processor, wherein a computer program is stored in the memory, and the processor is configured to execute the computer program to achieve the processing method according to claim 1.

15. A display device, comprising a plurality of pixel units and the processing device for pixel data according to claim 14.

16. A non-transitory computer readable storage medium, storing a computer program, wherein, in a case where the computer program is executed by a computer, the processing method according to claim 1 is achieved.

17. A display method of a display device, wherein the display device comprises a plurality of pixel units, and the display method comprises:

determining a target pixel point in pixel points of a display frame image to be revised to prolong the lifetime of white sub-pixels, wherein a pixel data of each of the pixel points comprises S initial pixel data of different primary colors and a white initial pixel data, the S initial pixel data of different primary colors corresponds to S primary colors respectively, the white initial pixel data corresponds to white, and S is a positive integer;

converting only a white initial pixel data in a pixel data of the target pixel point into S equivalent pixel data of the different primary colors, wherein a brightness of the white initial pixel data in the pixel data of the target pixel point during display is the same as a brightness of the S equivalent pixel data of the different primary colors during display, a display effect of the white initial pixel data in the pixel data of the target pixel point during display is the same as a display effect of the S equivalent pixel data of the different primary colors during display, and the white initial pixel data in the pixel data of the target pixel point is not related to S initial pixel data of the different primary colors in the pixel data of the target pixel point;

obtaining S target pixel data of the different primary colors and a white target pixel data corresponding to the target pixel point in the display frame image to be revised according to the S equivalent pixel data of the different primary colors and according to the S initial pixel data of the different primary colors in the pixel data of the target pixel point, wherein the white target pixel data corresponds to a 0 gray scale when the white initial pixel data corresponds to a non-zero gray scale; and controlling a pixel unit, which corresponds to the target pixel point, of the plurality of pixel units to display according to the S target pixel data of the different primary colors and the white target pixel data, wherein the obtaining the S target pixel data of the different primary colors and the white target pixel data of the target pixel point according to the S equivalent pixel data of the different primary colors and according to the S initial pixel data of the different primary colors in the pixel data of the target pixel point comprises:

superimposing the S equivalent pixel data of the different primary colors and the S initial pixel data of the different primary colors in the pixel data of the target pixel point respectively to obtain the S target pixel data of the different primary colors; and determining the white target pixel data to be 0 gray scale.

18. The display method according to claim 17, wherein each pixel unit of the plurality of pixel units comprises S primary color sub-pixels and a white sub-pixel, the S primary color sub-pixels are in one-to-one correspondence with the S target pixel data of the different primary colors, and the white sub-pixel corresponds to the white initial pixel data.

19. A processing device for pixel data, comprising:

a target pixel determination module, configured to determine a target pixel point in pixel points of a display frame image to be revised to prolong the lifetime of white sub-pixels, wherein a pixel data of each of the pixel points comprises S initial pixel data of different primary colors and a white initial pixel data, the S initial pixel data of different primary colors corresponds to S primary colors respectively, the white initial pixel data corresponds to white, and S is a positive integer;

a conversion module, configured to convert only a white initial pixel data in a pixel data of the target pixel point into S equivalent pixel data of the different primary colors, wherein a brightness of the white initial pixel data in the pixel data of the target pixel point during display is the same as a brightness of the S equivalent pixel data of the different primary colors during display, a display effect of the white initial pixel data in the pixel data of the target pixel point during display is the same as a display effect of the S equivalent pixel data of the different primary colors during display, and the white initial pixel data in the pixel data of the target pixel point is not related to the S initial pixel data of the different primary colors in the pixel data of the target pixel point; and a target pixel data acquisition module, configured to obtain S target pixel data of the different primary colors and a white target pixel data of the target pixel point according to the S equivalent pixel data of the different primary colors and according to the S initial pixel data of the different primary colors in the pixel data of the target pixel point, wherein the white target pixel data corresponds to a 0 gray scale when the white initial pixel data corresponds to a non-zero gray scale, wherein when obtaining the S target pixel data of the different primary colors and the white target pixel data of the target pixel point according to the S equivalent pixel data of the different primary colors and according to the S initial pixel data of the different primary colors in the pixel data of the target pixel point, the target pixel data acquisition module is configured to:

superimpose the S equivalent pixel data of the different primary colors and the S initial pixel data of the different primary colors in the pixel data of the target pixel point respectively to obtain the S target pixel data of the different primary colors; and determine the white target pixel data to be 0 gray scale.

* * * * *